United States Patent
Chown

[11] 3,933,455
[45] Jan. 20, 1976

[54] METHOD FOR JOINING OPTICAL FIBRE BUNDLES

[75] Inventor: Martin Chown, Harlow, England

[73] Assignee: International Standard Electric Corporation, New York, N.Y.

[22] Filed: May 17, 1974

[21] Appl. No.: 470,882

[30] Foreign Application Priority Data
June 14, 1973  United Kingdom............... 28284/73

[52] U.S. Cl. .............................. 65/4; 65/31; 65/42; 65/DIG. 7; 350/96 WG
[51] Int. Cl.² ..................... C03B 23/20; G02B 5/14
[58] Field of Search ................. 65/4, 31, 42, DIG. 7

[56] References Cited
UNITED STATES PATENTS

| | | | |
|---|---|---|---|
| 3,190,738 | 6/1965 | Upton | 65/4 X |
| 3,579,316 | 5/1971 | Dyott et al. | 65/4 |
| 3,830,667 | 8/1974 | Carpenter | 65/4 |

Primary Examiner—Robert L. Lindsay, Jr.
Attorney, Agent, or Firm—John T. O'Halloran; Menotti J. Lombardi, Jr.

[57] ABSTRACT

Misregistration and losses between the ends of coupled optical fibre-bundles are reduced by tapering the fibre ends. The ends are etched to remove a portion of the outer cladding glass around each glass core. The tapered ends are inserted into a low refractive index glass tube and drawn down in the tube to form a solid core glass zone. The solid end is polished to facilitate coupling to another bundle.

2 Claims, 2 Drawing Figures

METHOD FOR JOINING OPTICAL FIBRE BUNDLES

BACKGROUND OF THE INVENTION

1. Field of the Invention

This invention relates to the launching of light into optical fibre-bundles and particularly to a novel coupling arrangement between the fibre ends.

2. Description of the Prior Art

Optical coupling between one fibre-bundle and another may be achieved by polishing the ends of the bundles and placing a polished end of one bundle in close proximity with one of the polished ends of the other bundle. Unless special measures are taken to ensure that the ends of individual fibres of the first bundle all register exactly with the ends of fibres of the second bundle the randomness of registration will contribute to optical loss in the coupling. Some of the light will not be launched into the cores of the fibres of the second bundle but will be lost through being launched either into the cladding or into the interstices between fibres. In a typical close packed multi-mode optical fibre-bundle only about 60% of the total cross section of the bundle is provided by the fibre cores, and hence the loss arising from lack of registration will be a significant proportion of the total loss of such a coupling. This problem of launching efficiency is not confined to the launching of light from one fibre-bundle into another, but is a general problem affecting the launching of light into a fibre-bundle from any light source.

SUMMARY OF THE INVENTION

It is therefore the primary object of the present invention to provide an improved method for coupling ends of fibre-bundles with minimum losses from misregistration.

According to the present invention, this is achieved by forming a novel coupling region at at least one of the ends of a glass optical fibre-bundle. The method includes the steps of etching the fibres at that end of the bundle to produce tapered ends to the fibres, of inserting the tapered ends into the bore of a glass tube having a lower refractive index than that of the fibre cores, of fusing the assembly of tube and fibre ends while drawing it down so as to provide a zone from which interstices between the side walls of the tapered ends of the fibres have been eliminated, and of providing the fibre-bundle with a polished end within said zone.

There follows a description of the provision of a fibre optic bundle having a coupling region embodying the invention in a preferred form. The description refers to the accompanying drawings.

DESCRIPTION OF THE PREFERRED EMBODIMENT

Figure 1:
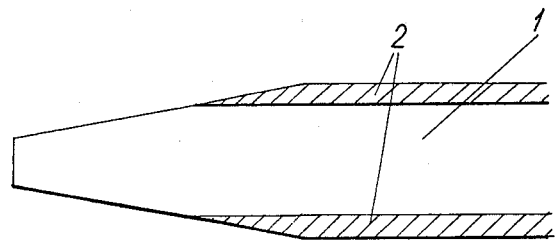
FIG. 1 depicts the end regions of an individual optical fibre of a fibre-bundle after it has been provided with a taper.

The fibres at one end of an optical fibre optic bundle are tapered by etching. An individual fibre of the bundle is depicted in FIG. 1, and comprises a central region 1 of core glass, typically 70 $\mu$ diameter, surrounded by lower refractive index cladding glass 2 typically 4 $\mu$ thick. The fibre optic bundle typically contains 500 to 1000 such fibres. The etching of the fibre ends is designed to remove entirely the cladding glass from a short section at their extreme ends and to provide a gradual transition from there to the region where the fibres have their full thickness of cladding glass. The taper is provided by gathering the fibres into a loose bundle and slowly lowering their ends into a hydrofluoric acid etch at a controlled rate. A selective etch which would preferentially etch the cladding glass would be an advantage, but is not essential.

Figure 2:
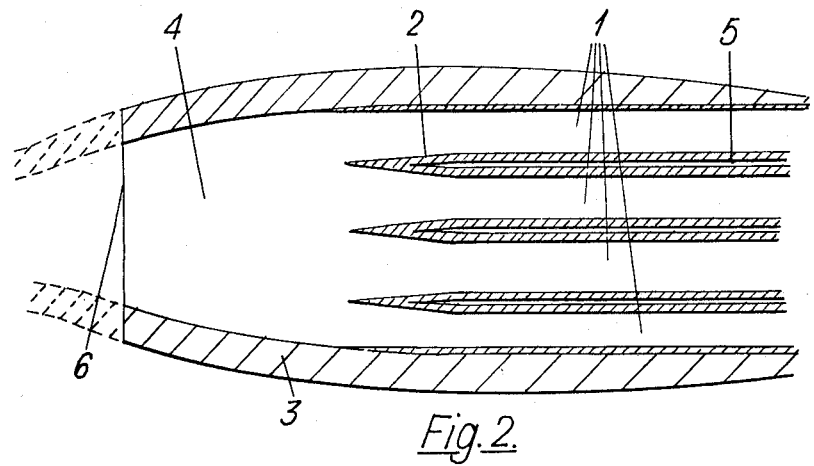
FIG. 2 depicts schematically an axial section through the coupling region of the entire optical fibre-bundle.

The fibre ends are then rinsed, cleaned, and inserted into the bore of a glass tube 3 (FIG. 2) of lower refractive index than the fibre cores 1. Next the assembly of tube and fibre ends is heated to fuse it and is drawn down to provide a zone 4 from which interstices 5 between fibres have been eliminated. Finally, the fibre-bundle is served, ground and polished within the zone 4 to provide an end face 6.

If the fibre-bundle is to be directly coupled to another, one factor contributing to optical loss in the coupling is mismatch between the adjacent end diameters of the two bundles. The presence of a taper in the zone 4 means that, within a limited range of values, the diameter of the end face 6 may be selected by sitting it an appropriate distance along the length of the zone 4.

It is to be understood that the foregoing description of a specific example of this invention is made by way of example only and is not to be considered as a limitation on its scope.

What is claimed is:

1. A method of providing a coupling region at least one of the ends of a glass optical fibre-bundle including a plurality of glass fibres each having an inner core glass and outer cladding glass, which method includes the steps of etching the fibres at that end of the bundle to remove the cladding glass and produce tapered ends to the individual fibres, of inserting the tapered ends into the bore of a glass tube having a lower refractive index than that of the fibre cores, of heating and fusing the assembly of tube and fibre ends while drawing it down so as to provide a solid zone of core glass within the tube and to eliminate the cladding glass and interstices between the side walls of the tapered ends of the fibres in said zone, and of forming a polished end within said zone.

2. The method of claim 1 including severing the fibre-bundle within said end zone and grinding and polising the severed end to provide an end face.

* * * * *